US012311544B2

(12) United States Patent
Ryu et al.

(10) Patent No.: US 12,311,544 B2
(45) Date of Patent: May 27, 2025

(54) SOFT GROWING ROBOT HAVING FOLDING TYPE GROWING UNIT

(71) Applicant: KOREA ADVANCED INSTITUTE OF SCIENCE AND TECHNOLOGY, Daejeon (KR)

(72) Inventors: Jee-Hwan Ryu, Daejeon (KR); Ji-Hun Kim, Chungcheongnam-do (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 964 days.

(21) Appl. No.: 17/349,343

(22) Filed: Jul. 12, 2021

(65) Prior Publication Data

US 2021/0394358 A1 Dec. 23, 2021

(30) Foreign Application Priority Data

Jun. 19, 2020 (KR) .......................... 10-2020-0074667

(51) Int. Cl.
*B25J 9/14* (2006.01)
*B25J 9/06* (2006.01)
(Continued)

(52) U.S. Cl.
CPC .............. *B25J 9/142* (2013.01); *B25J 9/065* (2013.01); *B25J 9/14* (2013.01); *B25J 13/00* (2013.01);
(Continued)

(58) Field of Classification Search
CPC . B25J 9/0009; B25J 9/065; B25J 9/104; B25J 9/14; B25J 9/142; B25J 13/00;
(Continued)

(56) References Cited

U.S. PATENT DOCUMENTS

2003/0168068 A1\* 9/2003 Poole ................. A61B 1/00156
128/850
2019/0217908 A1\* 7/2019 Hawkes ................... F01B 19/04
(Continued)

FOREIGN PATENT DOCUMENTS

WO WO-2022043670 A1 \* 3/2022 .............. B25J 18/06
WO WO-2024000799 A1 \* 1/2024
WO WO-2024018161 A1 \* 1/2024

*Primary Examiner* — Matthew Wiblin
(74) *Attorney, Agent, or Firm* — Hauptman Ham, LLP

(57) ABSTRACT

A growth-type soft robot includes a housing including an external body including an internal accommodation space and one side open and a fixing portion formed on a periphery of an open region of the external body, a growth unit including an outer periphery having one end connected to the fixing portion, an inner periphery spaced apart from an inner side of the outer periphery and extending to the accommodation space, and a bent portion connecting the other end of the outer periphery to one end of the inner periphery to form a front end space, and a data collecting unit including a cable extending along a central portion surrounded by the inner periphery and a sensing module acquiring external information, wherein the other end of the inner periphery forms a folded region, and a length of the growth unit is adjustable by air supplied to the front end space.

17 Claims, 17 Drawing Sheets

(51) Int. Cl.
*B25J 13/00* (2006.01)
*B25J 15/00* (2006.01)
*B25J 19/02* (2006.01)
*F15B 15/10* (2006.01)

(52) U.S. Cl.
CPC ........... *B25J 15/0019* (2013.01); *B25J 19/02* (2013.01); *B25J 19/023* (2013.01); *F15B 15/103* (2013.01)

(58) Field of Classification Search
CPC ...... B25J 15/0019; B25J 19/02; B25J 19/023; F15B 15/103
See application file for complete search history.

(56) References Cited

U.S. PATENT DOCUMENTS

| | | | | |
|---|---|---|---|---|
| 2022/0355468 | A1* | 11/2022 | Coad | ........................ B25J 18/06 |
| 2023/0173666 | A1* | 6/2023 | Ryu | ........................ B25J 18/06 74/490.05 |

\* cited by examiner

-Prior Art-

SOFT GROWING ROBOT HAVING FOLDING TYPE GROWING UNIT

CROSS-REFERENCE TO RELATED APPLICATIONS

This application claims priority under 35 U.S.C. § 119 to Korean Patent Application No. 10-2020-0074667, filed on Jun. 19, 2020, in the Korean Intellectual Property Office, the disclosure of which is incorporated herein by reference in its entirety.

TECHNICAL FIELD

The following disclosure relates to a growth-type soft robot, and in particular, to a growth-type soft robot including a foldable growth unit designed to be extendable forward by pneumatic pressure and having at least a portion accommodated in a folded state to facilitate mounting of a data collecting unit acquiring certain data.

BACKGROUND

Various types of moving robots have been developed to move to specific destinations on behalf of people and perform various inspections, maintenance/repair work, life-saving activities, etc., in a situation in which people cannot reach the destinations, such as pipes having a hollow therein or piles of ruins of collapsed buildings.

The moving robot of the related art is formed in a form that a camera and a tool for maintenance work are mounted on a car body equipped with a caterpillar crawler or in a form that may move by applying a movement of a looper to a hose extending in a longitudinal direction, etc.

However, the former caterpillar crawler type robot may be suitable for traveling on a horizontal plane but cannot travel in a vertical direction or an inclined direction. In addition, the latter robot based on the looper movement has limitations in its use because it is difficult to move in variously curved paths such as a curved portion, a T-shaped portion, or a Y-shaped branch portion.

To compensate for these shortcomings, recently, a soft robot based on a method in which a tip portion grows, a so-called vine robot, has been developed.

As shown in FIG. 1, a vine robot 10 having an inner periphery 11 and an outer periphery 12 protrudes externally from a case 30, and in particular, the inner periphery 11 is drawn into an inner side of the case 30 and wound around a feeding drum 20.

The outer periphery 21 is fixed to the case 30, and in this state, when a compressor 40 for generating compressed air sprays compressed air to a space 13 between the outer periphery 12 and the inner periphery 11, the inner periphery 11 is switched to the outer periphery 12 to increase a length of a body.

Such a vine robot, having the advantage of operating three-dimensionally compared to the related art technologies described above, has come to prominence as the most popular technology in recent years.

However, in order for the vine robot to explore various environments, a sensor for exploration, such as a camera or an infrared sensor, is essential.

To this end, in the related art, a method of mounting a sensor on a rigid mount and maintaining the mount at the end of the vine robot has been most commonly used.

However, such a vine robot cannot pass through a narrow space due to the rigid mount, and an interaction of the mount with an external environment significantly reduces the inherent advantages of the vine robot.

In addition, if the vine robot is operated with a sensor simply inserted in the center thereof, a phenomenon in which a distance over which the sensor is moved forward increases to doubling of a growth length of the vine occurs in terms of characteristics thereof.

Therefore, it is necessary to control the distance over which the sensor moves forward from the outside, but since the related art vine robot is provided with a vine wound therein, a cable of the sensor is inevitably wound together with the vine, causing a problem in that it is physically impossible to control a sensor position.

That is, a method for mounting a sensor, while maintaining all the advantages of the vine robot has not been developed yet, and thus, a method for solving the problems described above is required.

SUMMARY

An exemplary embodiment of the present invention is directed to operate a data collecting unit for acquiring certain data together in the process of operating a growth-type soft robot such as a vine robot, while maintaining the inherent advantages of the growth-type soft robot.

The problems of the present invention are not limited to the problems mentioned above, and other problems not mentioned will be clearly understood by those skilled in the art from the following description.

In one general aspect, a growth-type soft robot including a foldable growth unit includes: a housing including an external body including an internal accommodation space and one side open and a fixing portion formed on a periphery of an open region of the external body; a growth unit including an outer periphery having one end connected to the fixing portion, an inner periphery spaced apart from an inner side of the outer periphery and extending to the accommodation space, and a bent portion connecting the other end of the outer periphery to one end of the inner periphery to form a front end space by the outer periphery, the bent portion, and the inner periphery; and a data collecting unit including a cable extending along a central portion surrounded by the inner periphery and a sensing module provided on one side of the cable and acquiring external information, wherein the other end of the inner periphery is folded by multiple stages to form a folded region, and a length of the growth unit is adjusted by pressure of air supplied to the front end space.

The housing may further include an internal body disposed in the accommodation space and extending to surround a portion of the cable, wherein the folded region surrounds a circumference of the internal body.

The growth-type soft robot may further include: a roller unit including at least one driving roller rotating in contact with the inner periphery.

The roller unit may include a pair of driving rollers and a gear portion, the pair of driving rollers may be disposed to be spaced apart from each other based on the internal body and contacting the inner periphery, and the pair of driving rollers may be formed to perform a rotational motion simultaneously through the gear portion.

The driving roller may include a circular roller body and a depression inwardly depressed from the roller body, and the depression may be disposed to face the internal body and depressed to face an outer curvature of the internal body.

The roller unit may further include one or more auxiliary rollers rotating in contact with the inner periphery and disposed to be spaced apart from the driving roller in a direction of both sides, each of the plurality of rollers may include one or more protrusions protruding outward based on the roller body, and an end of each of the plurality of protrusions may be bent to be biased to one side of a rotation direction.

The auxiliary roller may have a pair of inclined surfaces connecting the end of the protrusion to an outer circumferential surface of the roller body, and the pair of inclined surfaces may have different lengths.

One of the pair of inclined surfaces may protrude to one side of the rotation direction, and the other inclined surface may be depressed to one side of the rotation direction.

Among the pair of inclined surfaces, a relatively shorter inclined surface may be depressed to one side of the rotation direction so that the inner periphery of the growth unit is pressed to be folded.

The roller unit may include a pair of auxiliary rollers and a gear portion, the pair of auxiliary rollers may be disposed to be spaced apart from each other based on the internal body and in contact with the inner periphery, and the pair of driving rollers may perform a rotational motion simultaneously through the gear portion.

The roller unit may further include a first fixing portion and a second fixing portion each fixing both ends of the driving roller to an inner surface of the external body, and the roller unit may be rotatably coupled with the first fixing portion and the second fixing portion.

The growth-type soft robot may further include: a chamber coupled to the other side of the housing; and an airbag accommodated on the chamber and pressing the cable.

The housing may further include a guide body extending to one side of the internal body, the cable may be disposed on a hollow of the guide body and the internal body, and an outer diameter of the guide body may be smaller than an outer diameter of the internal body.

The housing may further include a coupling body disposed on the other side of the external body and fixing the other end of the inner periphery.

The housing may further include a cover portion disposed to surround the coupling body and coupled to be fixed to the external body.

The coupling body and the cover portion may include a through hole through which the cable penetrates.

The coupling body may include a hollow opened on one side, and an inner diameter of the coupling body may correspond to an outer diameter of the internal body so that the internal body is inserted into the hollow of the coupling body.

The fixing portion may have a shape in which a diameter thereof is reduced toward one side.

The housing may further include an extension body coupled to the other end of the external body, and the coupling body may be disposed on the extension body.

The growth-type soft robot may further include: a first supply pneumatic unit injecting a first gas to an outer side of the inner periphery; and a second supply pneumatic unit injecting a second gas to an inner side of the inner periphery.

Other features and aspects will be apparent from the following detailed description, the drawings, and the claims.

DETAILED DESCRIPTION OF EXEMPLARY EMBODIMENTS

Hereinafter, a growth-type soft robot including a foldable growth unit according to various exemplary embodiments of the present invention will be described in detail with reference to the accompanying drawings. The drawings are provided as examples in order to convey the spirit of the present invention to those skilled in the art. Therefore, the present invention is not limited to the drawings presented hereinafter and may be embodied in other forms. Throughout the specification, the same reference numbers will be used to refer to the same or like components.

If there are no other definitions in technical terms and scientific terms used here, the technical terms and scientific terms have the meanings commonly understood by those skilled in the art to which the present invention pertains, and in the following description and accompanying drawings, descriptions of known functions and components that may unnecessarily obscure the subject matter will be omitted.

First Exemplary Embodiment

Figure 1:
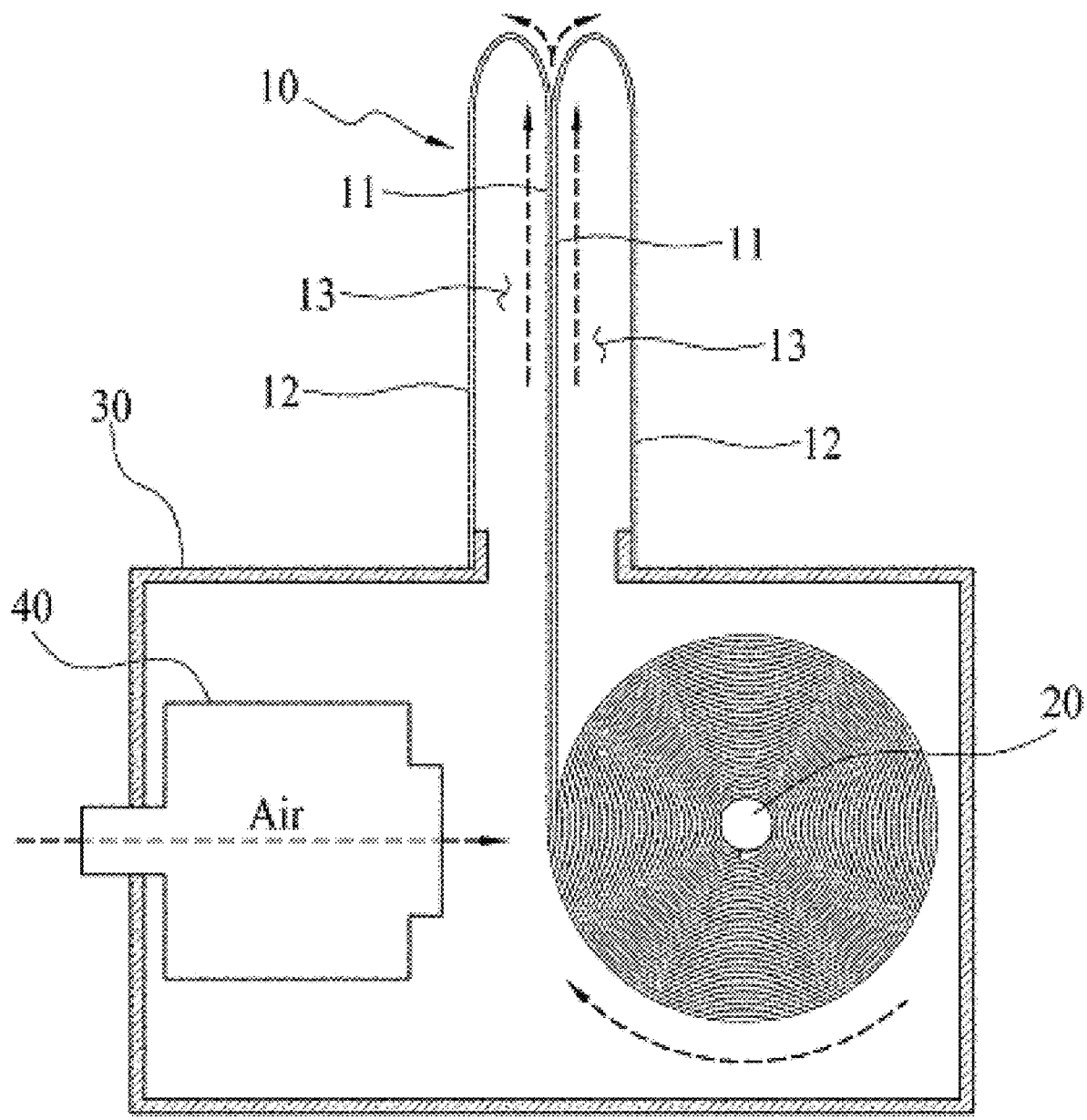
FIG. 1 is a view illustrating a structure of a growth-type soft robot of the related art.
Figure 2:
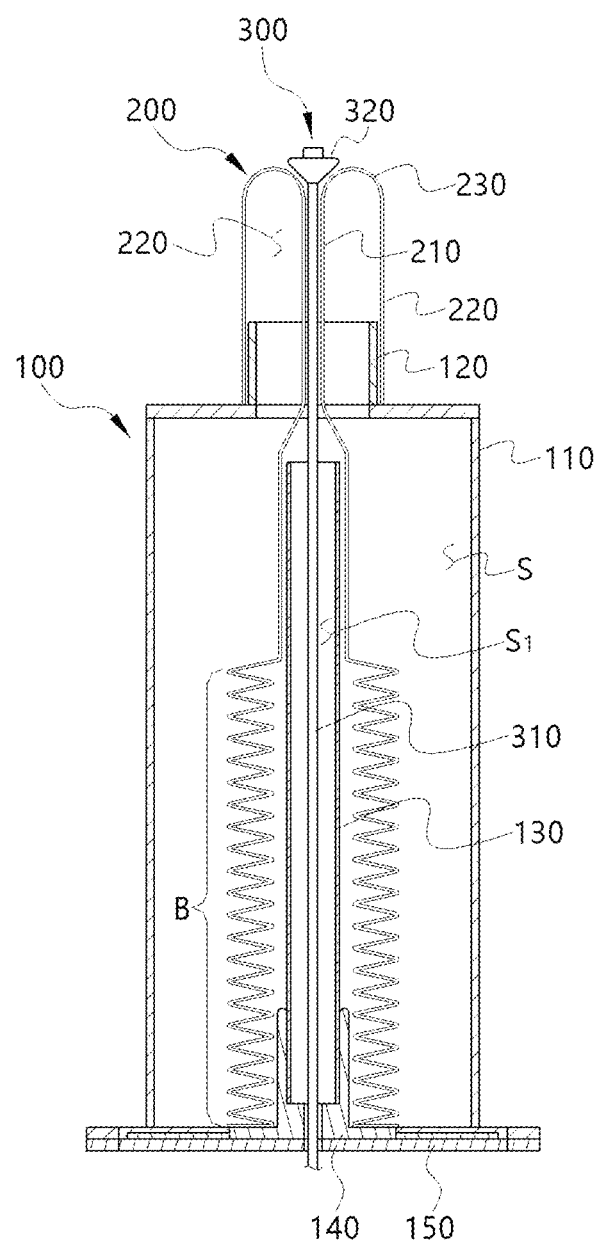
FIGS. 2 and 3 are side cross-sectional views illustrating a growth-type soft robot according to a first exemplary embodiment of the present invention.
Figure 3:
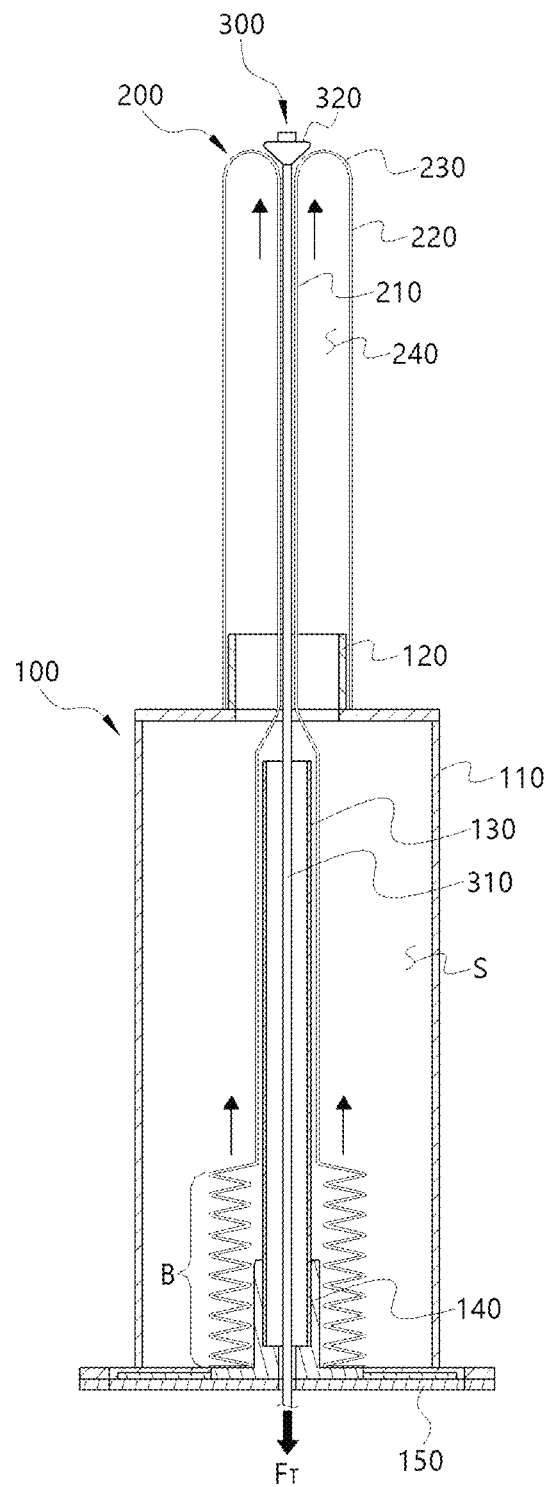
Figure 4:
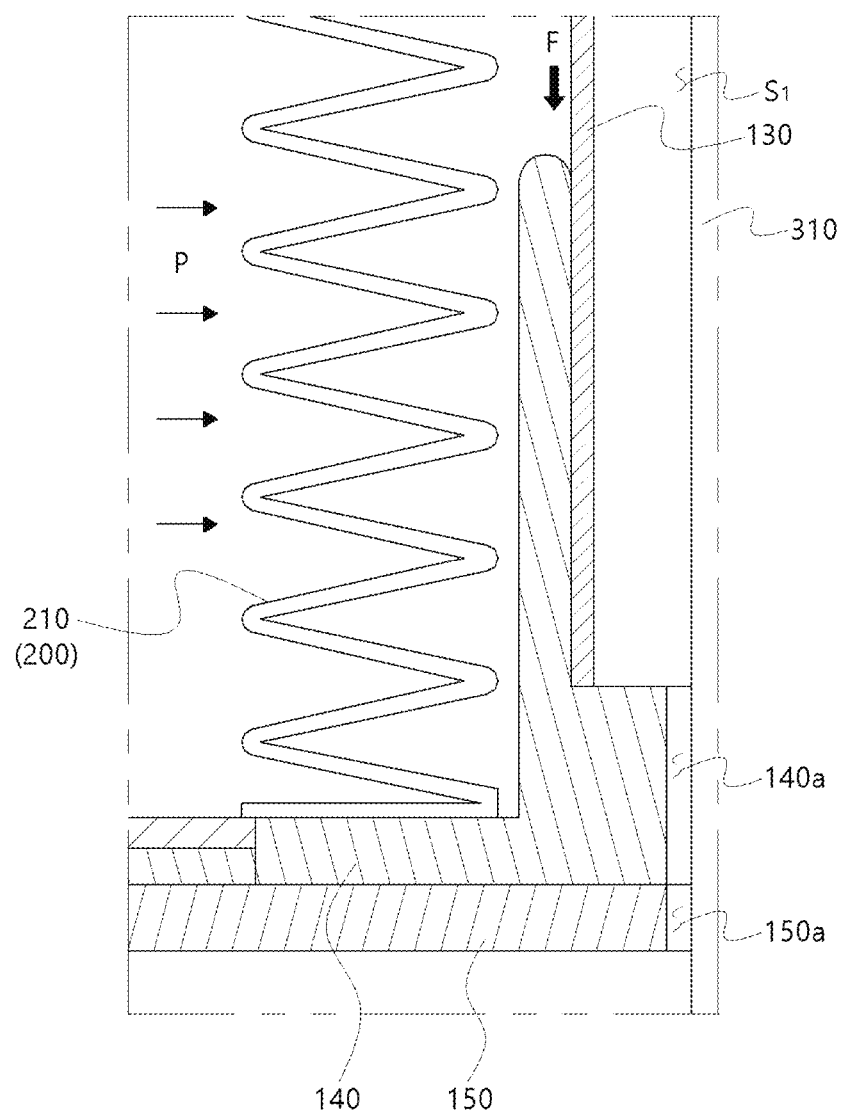
FIG. 4 is a partially enlarged view of the growth-type soft robot according to the first exemplary embodiment of the present invention.

FIGS. 2 to 4 relate to a growth-type soft robot according to a first exemplary embodiment of the present invention, in which FIGS. 2 and 3 are side cross-sectional views of the growth-type soft robot and FIG. 4 is a partially enlarged view of the growth-type soft robot.

Referring to FIG. 2, a growth-type soft robot according to the first exemplary embodiment of the present invention may include a housing 100, a growth unit 200, and a data collecting unit 300. Here, the housing 100 includes an external body 110 having an accommodation space S formed therein and one side opened, a fixing portion 120 formed along a circumference of the opened region of the external body 110, and an internal body 130 extending to have a predetermined length in the accommodation space S.

The growth unit 200 may include an inner periphery 210 positioned inside the accommodation space S and an open inner surface of the housing 100, an outer periphery 220 connected to the fixing portion 120, and a bent portion 230 connecting the inner periphery 210 and the outer periphery 220, and the growth unit 200 may include a front end space 240 formed by the inner periphery 210, the outer periphery 220, and the bent portion 230. Here, a portion of a region of the inner periphery 210 accommodated in the accommodation space S may be folded by stages to form a folded region B, and the folded region B may surround an outer circumference of the internal body 130. Accordingly, in the growth unit 200, the folded region B is sequentially spread by pressure of air supplied to the front end space 240, the inner periphery 210 may be switched toward the outer periphery 220 along the bent portion 230, and a length of the inner periphery 210 may be extended. Hereinafter, a direction in which the growth unit 200 is increased is defined as a forward direction and a direction in which a length of the growth unit 200 is reduced is defined as a rearward direction, based on which a detailed description will be given.

The data collecting unit 300 may include a cable 310 extending along a central portion surrounded by the inner periphery 210 of the growth unit 200 and a sensing module 320 provided at a front end of the cable 310 and acquiring data of external information. Here, the sensing module 320 may be in various forms such as a sensor or a camera, and the form of the sensing module 320 may be modified according to a type of information to be acquired. The cable 310 extends along the central portion surrounded by the inner periphery 210 of the growth unit 200, inserted into an internal space $S_1$ formed in the internal body 130 in the accommodation space S and extends to the rear of the external body 110. Here, since the cable 310 of the data collecting unit 300 does not interfere with the folded region B of the inner periphery 210, a position thereof may be separately controlled.

The housing 100 may further include a coupling body 140 disposed on a rear end surface of the external body 110, while the fixing portion 120 is disposed at a front end surface of the external body 110. Here, an end of the inner periphery 210 of the growth unit 200 may be coupled to the coupling body 140. The coupling body 140 may be detachably coupled to the external body 110, and the housing 100 may further include a cover portion 150 to prevent the coupling body 140 from escaping after the coupling body 140 is coupled to the external body 110. Here, the coupling body 140 may be opened and hollowed to a front side of a front end, and the inner periphery 210 of the growth unit 200 may be connected to an outer surface of the front side of the coupling body 140.

Referring to FIG. 3, when a gas is injected into the accommodation space S, the growth unit 200 may be expanded to the front side by the pressure. Here, a length of the growth unit 200 may be increased as the folded region B of the growth unit 200 is reduced. Here, when the length of the growth unit 200 is increased in a state in which the data collecting unit 300 is fitted in the center of the growth unit 200, a distance over which the data collecting unit 300 moves may increase by about double in terms of the characteristics of the growth unit 200 including the inner periphery 210 and the outer periphery 220. Here, a tension $F_T$ may be applied to the rear side of the data collecting unit 300 so that a growth length of the data collecting unit 300 may be controlled. Here, since the growth unit 200 and the data collecting unit 300 of the growth-type soft robot according to the present invention may be individually controlled, a position of the data collecting unit 300 may be controlled, by overcoming the shortcomings in which the growth-type soft robot of the related art cannot be individually controlled. In addition, the existing advantages including the inherent characteristics of the growth unit 200 that do not interact with the outside may be maintained.

Referring to FIG. 4, the inner periphery 210 of the growth unit 200 having the folded region B may include an inner side in which the internal body 130 and the cable 310 are disposed and an outer side opposing the inner side. Here, in order for the growth unit 200 to move forward, a gas may be injected to the outer side of the inner periphery 210 as described above, and a frictional force F may occur as the inner periphery 210 comes into contact with an outer surface of the internal body 130 as the inner periphery 210 in a folded state is spread. This may act as a factor inhibiting growth of the inner periphery 210 to lead to a problem of making it difficult to control the inner periphery 210, and the growth-type soft robot according to the present invention may solve the growth inhibition problem due to the frictional force F by injecting a separate gas between an inner surface of the inner periphery 210 and an outer surface of the internal body 130 or adding different components as described hereinafter. In addition, since the coupling body 140 and the cover portion 150 have through holes 140a and 150a, respectively, the coupling body 140 and the cover portion 150 may extend into the internal space $S_1$ through the cable 310. Here, an inner diameter of a hollow of the coupling body may correspond to an outer diameter of the internal body 130 so that the internal body 130 may be fixed to the hollow of the coupling body 140, and since the through hole 140a of the coupling body 140 is smaller than the outer diameter of the internal body 130, the coupling body 140 may be prevented from escaping rearward.

Second Exemplary Embodiment

Figure 5:
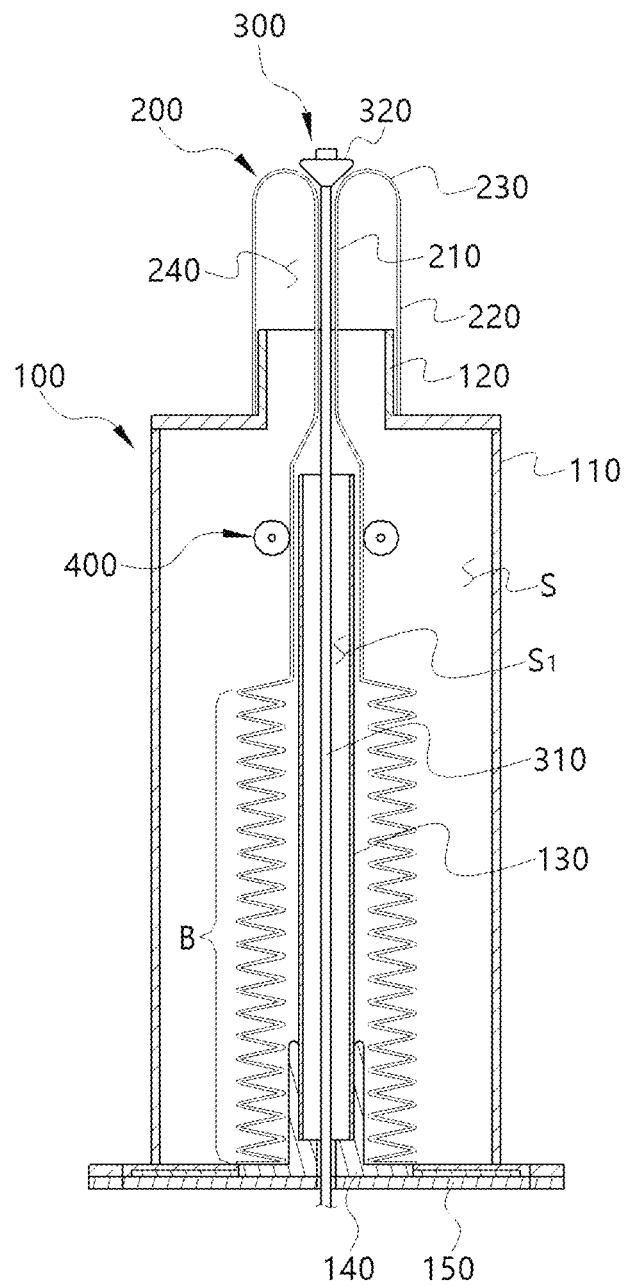
FIG. 5 is a side cross-sectional view of a growth-type soft robot according to a second exemplary embodiment of the present invention.
Figure 6:
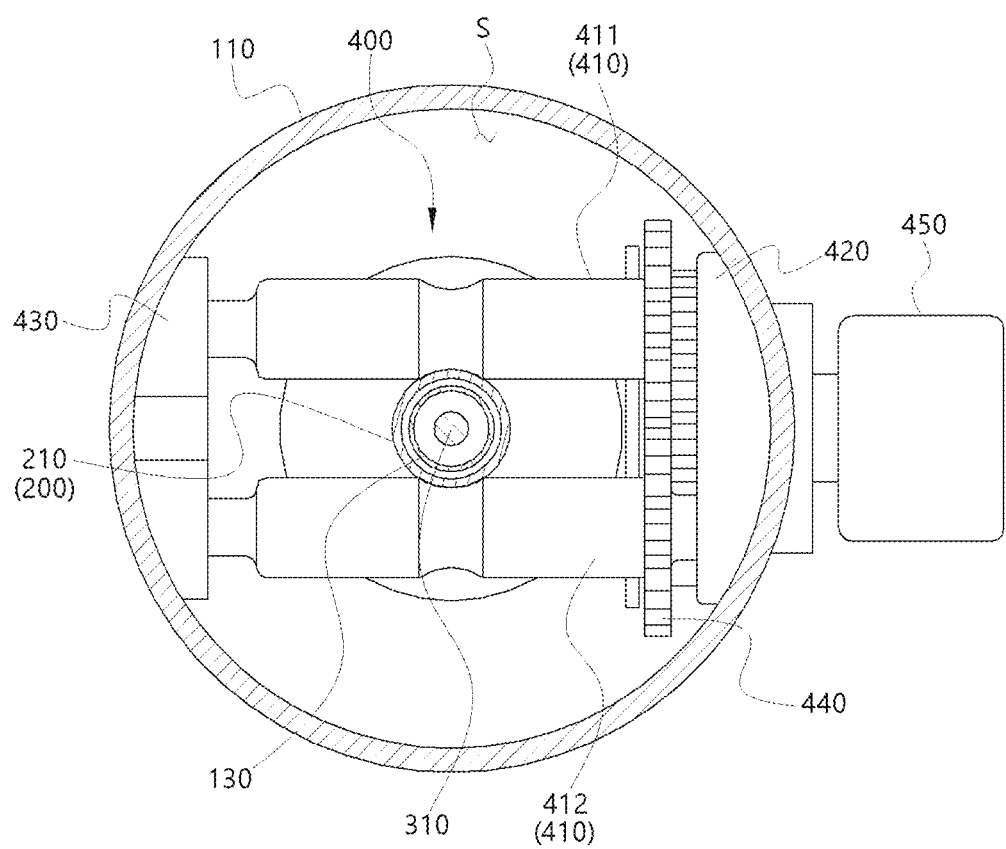
FIG. 6 is a plane cross-sectional view of the growth-type soft robot according to the second exemplary embodiment of the present invention.

FIGS. 5 and 6 relate to a growth-type soft robot according to a second exemplary embodiment of the present invention. FIG. 5 is a side cross-sectional view of the growth-type soft robot, and FIG. 6 is a plan cross-sectional view of the growth-type soft robot. Hereinafter, in the description of the growth-type soft robot according to the second exemplary embodiment of the present invention, the description of the same components as those of the first exemplary embodiment will be omitted and additional components will be described in more detail.

Referring to FIG. 5, the growth-type soft robot according to the second exemplary embodiment of the present invention may further include a roller unit 400 formed to be rotatable in a state of being in contact with the inner periphery 210 of the growth unit 200 covering an outer surface of the internal body 130 to allow the inner periphery 210 of the growth unit 200 to move forward or to be returned to its original position.

Referring to FIG. 6, the roller unit 400 may include a driving roller 410, a first fixing portion 420, and a second fixing portion 430. Here, the driving roller 410 may rotate forward to cause the inner periphery 210 of the growth unit 200 to move forward or may rotate backward to cause the inner periphery 210 to be returned to its original position. Also, the driving roller 410 may be provided in plurality including a first driving roller 411 and a second driving roller 412, and the plurality of driving rollers 410 may be arranged to be spaced apart from each other based on the internal body 130 or may be arranged in a front-rear direction which is a growth direction of the growth unit 200.

The first fixing portion 420 and the second fixing portion 430 may be arranged such that positions of one end and the other end of the driving roller 410 are fixed, respectively. In this case, the driving roller 410 may be rotatably connected to the first fixing portion 420 and the second fixing portion 430 through a bearing or the like. Here, the first fixing portion 420 and the second fixing portion 430 may be disposed on the inner surface of the external body 110.

The roller unit 400 may further include a gear portion 440 and an actuator 450. Here, the actuator 450 may be configured as a power generating device such as a motor, and the actuator 450 may be provided in plurality and the plurality of actuators 450 may be connected to a plurality of the driving rollers 410, the actuator 450 may be connected to one of a plurality of driving rollers 410 so that power may be distributed to other driving roller 410 through the gear portion 440, or the gear portion 440 may connect a shaft of the actuator 450 to the plurality of driving rollers 410 to distribute power. That is, various combinations may be made.

Figure 7:
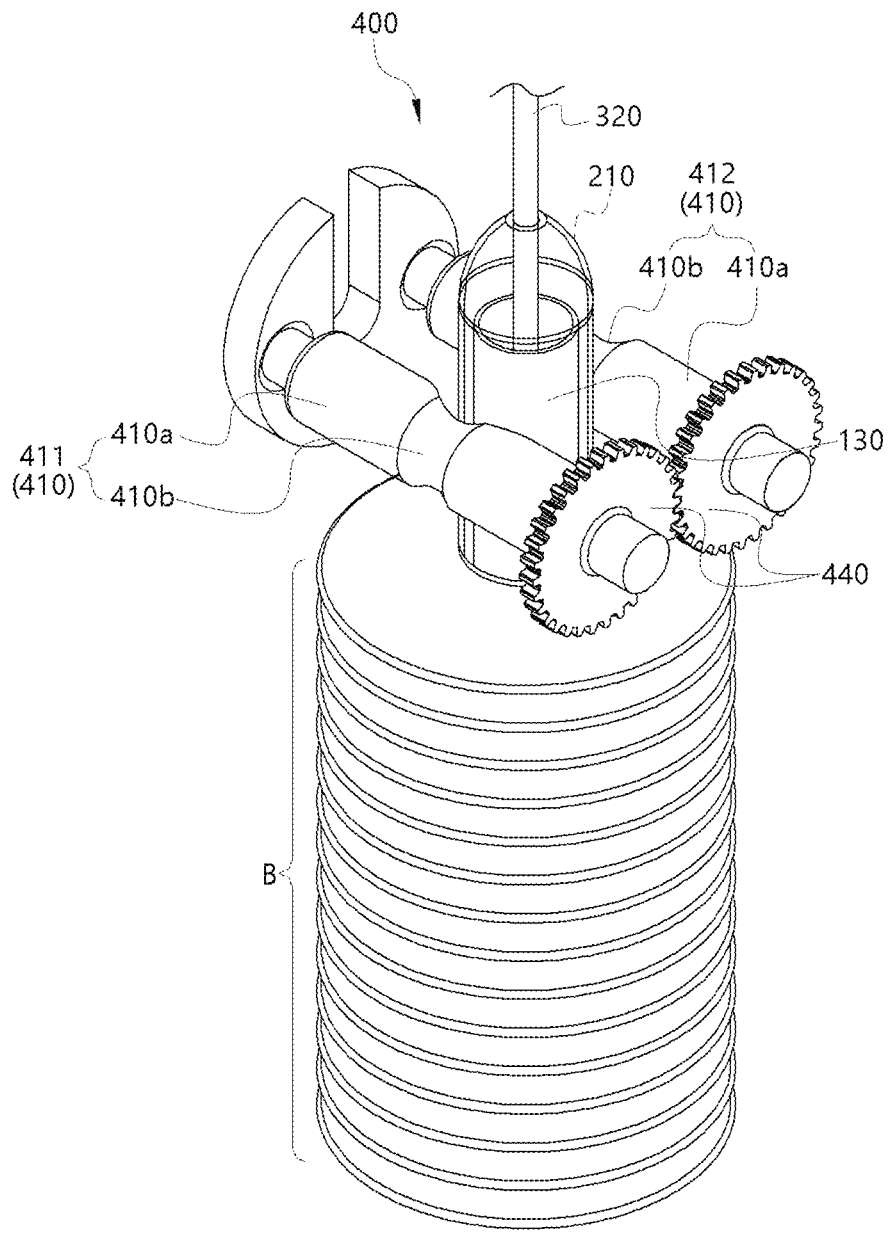
FIG. 7 is a perspective view of a roller unit according to the second exemplary embodiment of the present invention.
Figure 8:
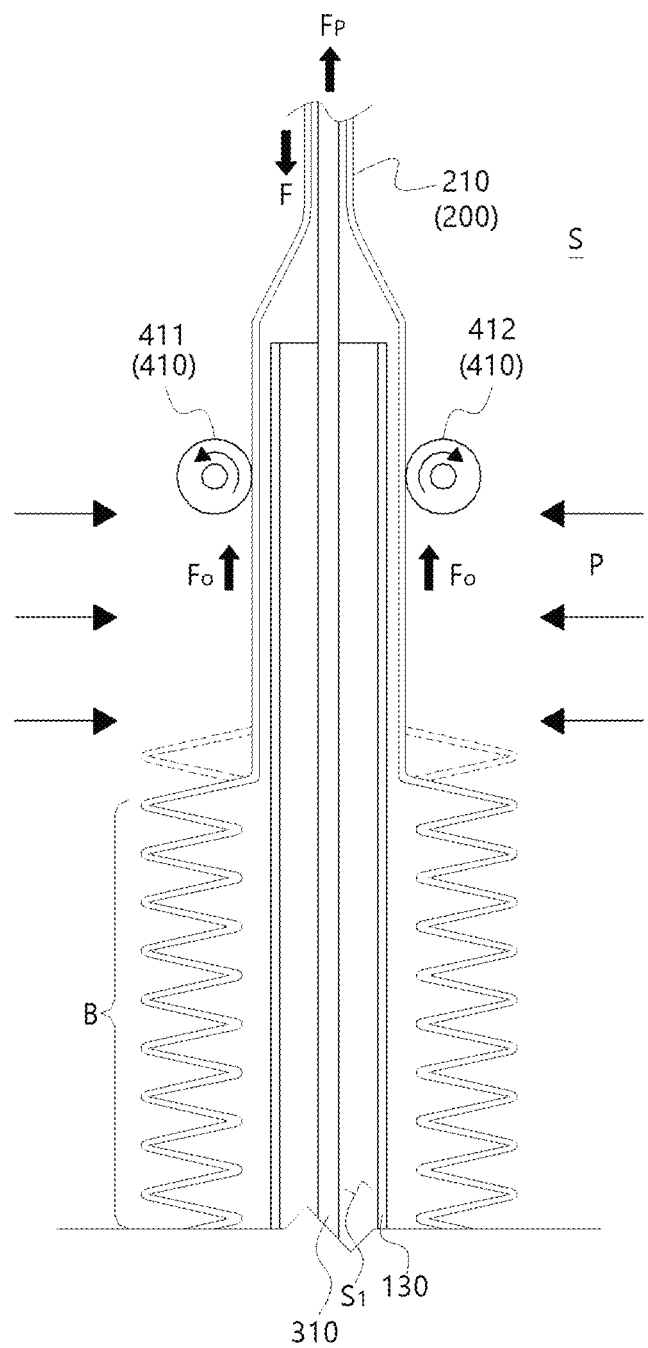
FIGS. 8 and 9 are views illustrating an operation of the growth-type soft robot according to the second exemplary embodiment of the present invention.
Figure 9:
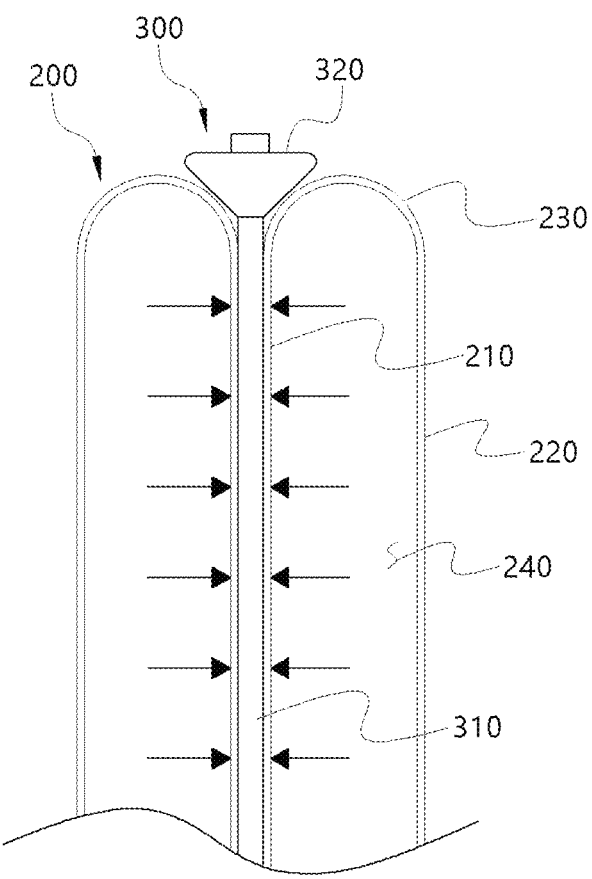

FIGS. 7 to 9 relate to a growth-type soft robot according to a second exemplary embodiment of the present invention, in which FIG. 7 is a perspective view of a roller unit and FIGS. 8 and 9 are operation examples of the growth-type soft robot, respectively.

Referring to FIG. 7, when the first driving roller 411 and the second driving roller 412 are disposed to be spaced apart from each other with respect to the internal body 130, the inner periphery 210 may pass through between the first driving roller 411 and the internal body 130 and between the second driving roller 412 and the internal body 130. Here, when the folded region B of the inner periphery 210 is reduced for growth, the driving roller 410 may rotate the inner periphery 210 to move forward, and in the case of an opposite motion, the driving roller 410 may rotate the inner periphery 210 to be retracted to the folded region B. Also, in a case in which the first driving roller 411 and the second driving roller 412 are coupled through a gear portion 440 having the same gear teeth, when one driving roller 410 rotates, the other driving roller 410 may be rotated at the same angular velocity. Here, the driving roller 410 may include a cylindrical roller body 410a having a predetermined area and a depression 410b formed on the roller body 410a and depressed to have a smaller area, and the depression 410b may be disposed to be in contact with the inner periphery 210. As the depression 410b is formed to have curvature corresponding to curvature of an outer circumferential surface of the internal body 130, the driving roller 410 may come into contact with the entire area of the inner periphery 210 of the growth unit 200 to minimize loss of driving power.

Referring to FIG. 8, when a gas is injected from outside of the inner periphery 210 of the growth unit 200 and external pressure P is applied, driving power Fp may be generated to allow the growth unit 200 to move in a direction of a front end. Here, when another gas pressure higher than the external pressure P is applied into the inner periphery 210, an outer surface of the inner periphery 210 may be in close contact with the first driving roller 411 and the second driving roller 412, and the first driving roller 411 and the second driving roller 412 may rotate to apply an additional external force FO. Accordingly, a frictional force F generated as the inner periphery 210 of the growth unit 200 is in close contact with the internal body 130 is canceled out, and controlling may be performed more smoothly.

Referring to FIG. 9, a front end of the inner periphery 210 may be expanded to press a front end of the cable 310 of the data collecting unit 300, and the bent portion 230 may press the sensing module 320 of the data collecting unit 300 forward. Here, as described above, a tension may be applied to the cable 310, so that the sensing module 320 may be maintained to be disposed to be adjacent to the bent portion 230.

Third Exemplary Embodiment

Figure 10:
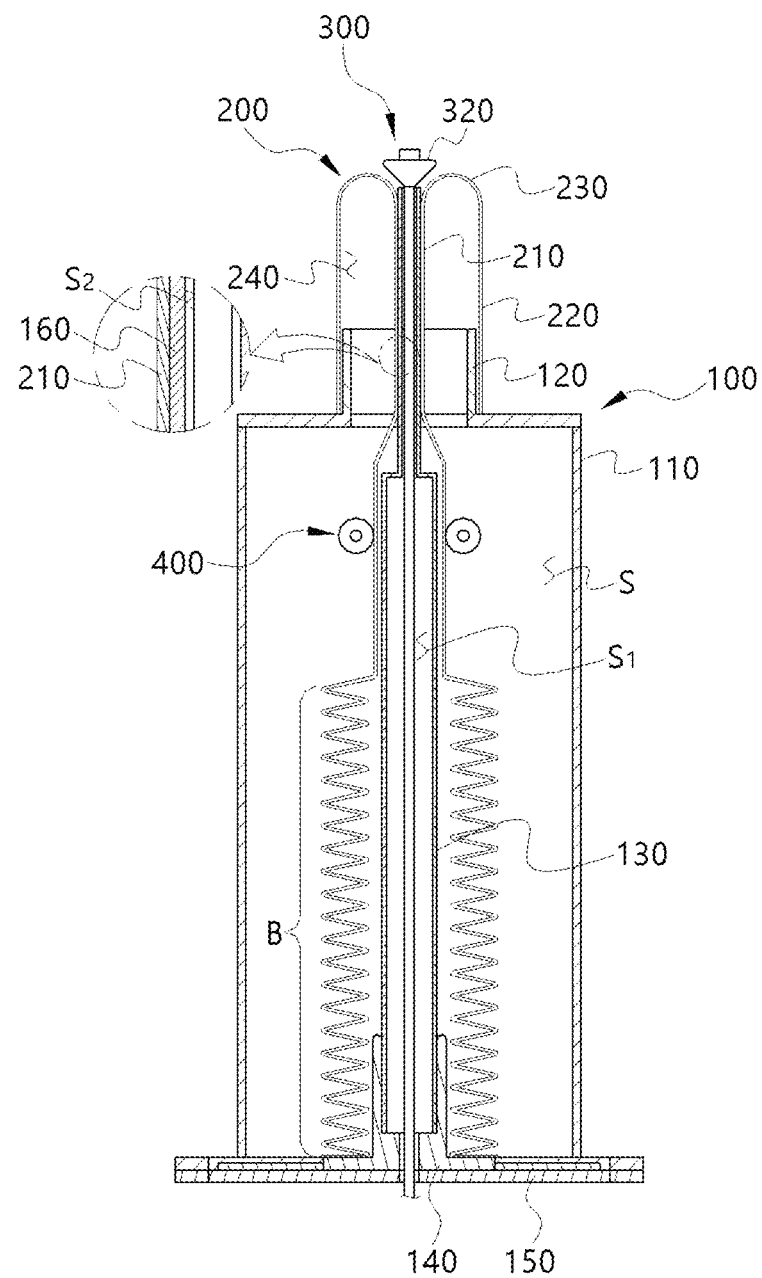
FIG. 10 is a side cross-sectional view of a growth-type soft robot according to a third exemplary embodiment of the present invention.

FIG. 10 relates to a growth-type soft robot according to a third exemplary embodiment of the present invention, and FIG. 10 is a side cross-sectional view of the growth-type soft robot. Hereinafter, in the description of the growth-type soft robot according to the third exemplary embodiment of the present invention, the description of the same components as those of the exemplary embodiments described above will be omitted, and additional components will be described in more detail.

Referring to FIG. 10, the growth-type soft robot according to the third exemplary embodiment of the present invention may further include a guide body 160 in which the housing 100 is connected to the internal body 130 and extends forward. In this case, the guide body 160 may have an outer diameter smaller than an outer diameter of the internal body 130 and may have a hollow in which the cable 310 of the data collecting unit 300 may be disposed. Here, the guide body 160 may be formed of a soft material so as to be deformable by an external force, and a length thereof in a front-rear direction may be designed and modified to suit a situation to which it is applied. When the length of the guide body 160 is formed shorter than a maximum growth length of the growth unit 200, a frictional force may be minimized because a certain distance is maintained between the guide body 160 and the inner periphery 210 of the growth unit 200. In addition, in the present invention, a friction between the inner periphery 210 of the growth unit 200 and the cable 310 may be reduced by applying a method of coating the cable 310 with a material having a low coefficient of friction.

Fourth Exemplary Embodiment

Figure 11:
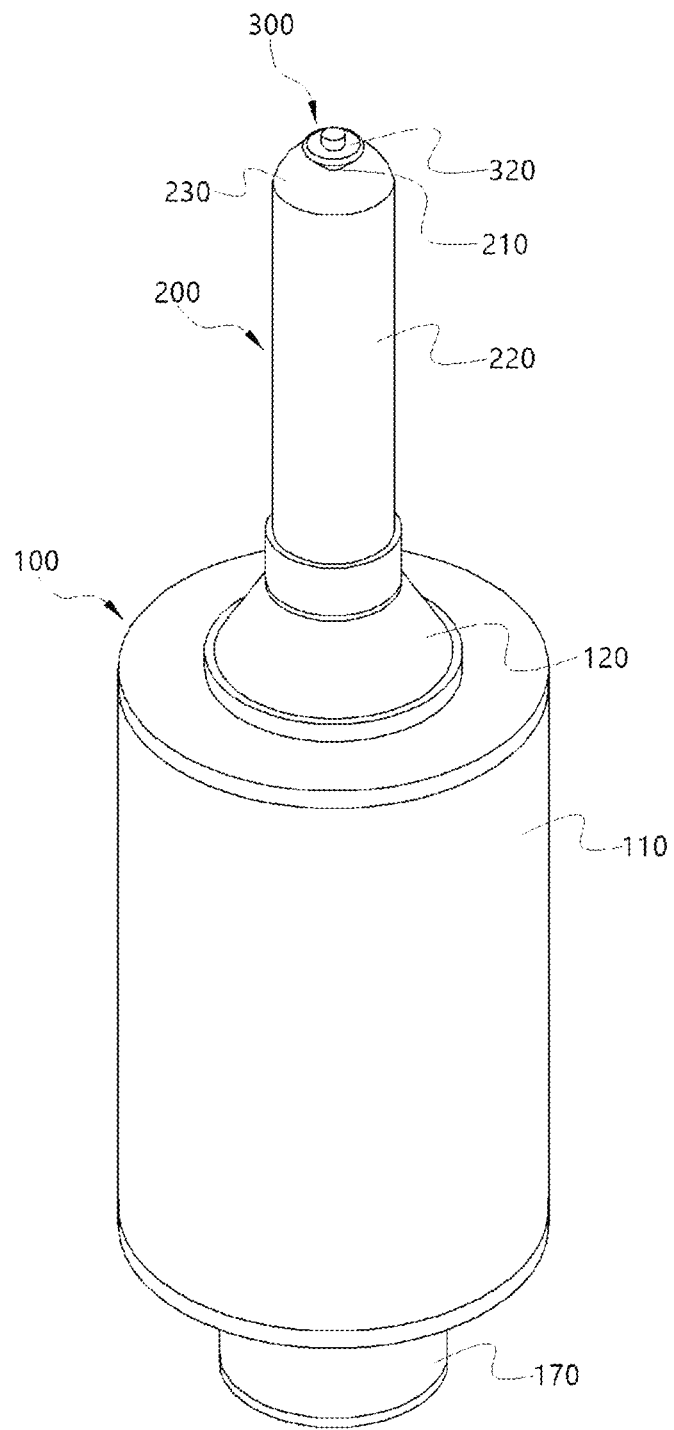
FIG. 11 is a perspective view of a growth-type soft robot according to a fourth exemplary embodiment of the present invention.
Figure 12:
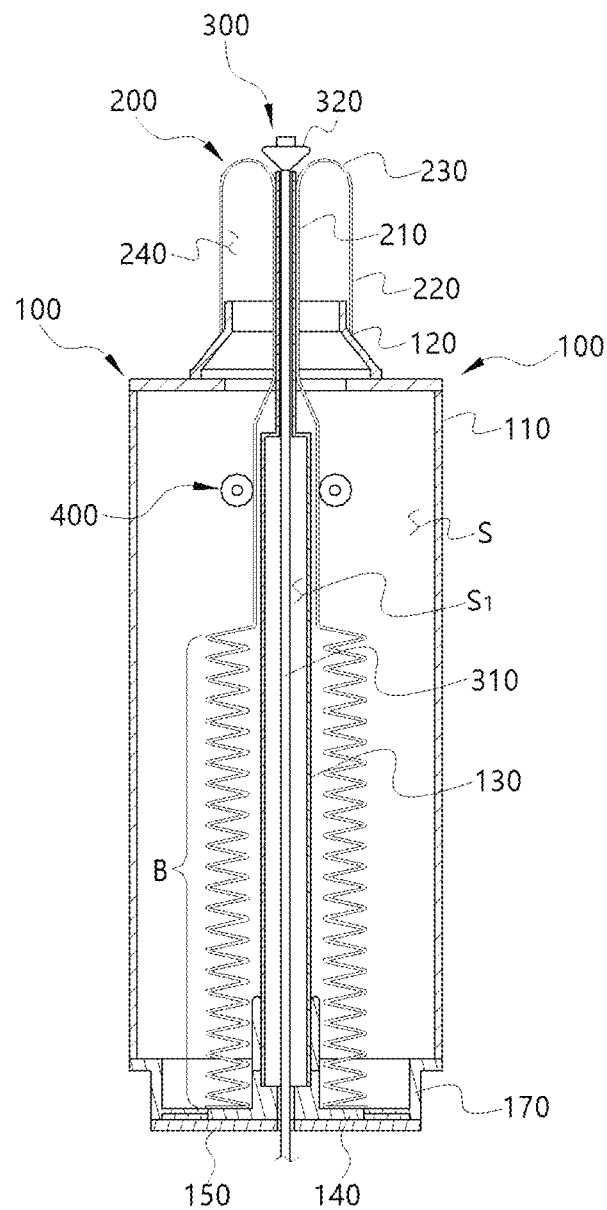
FIG. 12 is a side cross-sectional view of the growth-type soft robot according to the fourth exemplary embodiment of the present invention.

FIGS. 11 and 12 relate to a growth-type soft robot according to a fourth exemplary embodiment of the present invention, in which FIG. 11 is a perspective view of the growth-type soft robot and FIG. 12 is a side cross-sectional view of the growth-type soft robot. In the description of the growth-type soft robot according to the fourth exemplary embodiment of the present invention, which will be described below, descriptions of the same components as those of the exemplary embodiments described above will be omitted, and additional components will be described in more detail.

Referring to FIGS. 11 and 12, the fixing portion 120 may be deformed into various shapes such as a cylindrical shape as well as a shape in which a diameter becomes narrower toward the front side. Here, an end of the outer periphery 220 of the growth unit 200 may be fixed to the fixing portion 120 and may be expanded forward by a gas introduced into a front end space 240 formed by the inner periphery 210, the outer periphery 220, and the bent portion 230.

The housing 100 may further include an extension body 170 extending toward a rear side of the external body 110 in order to secure a front and rear length of the folded region B. Here, as the coupling body 140 and the cover portion 150 are disposed on the extension body 170, the end of the inner periphery 210 may be fixed to the coupling body 140.

Fifth Exemplary Embodiment

Figure 13:
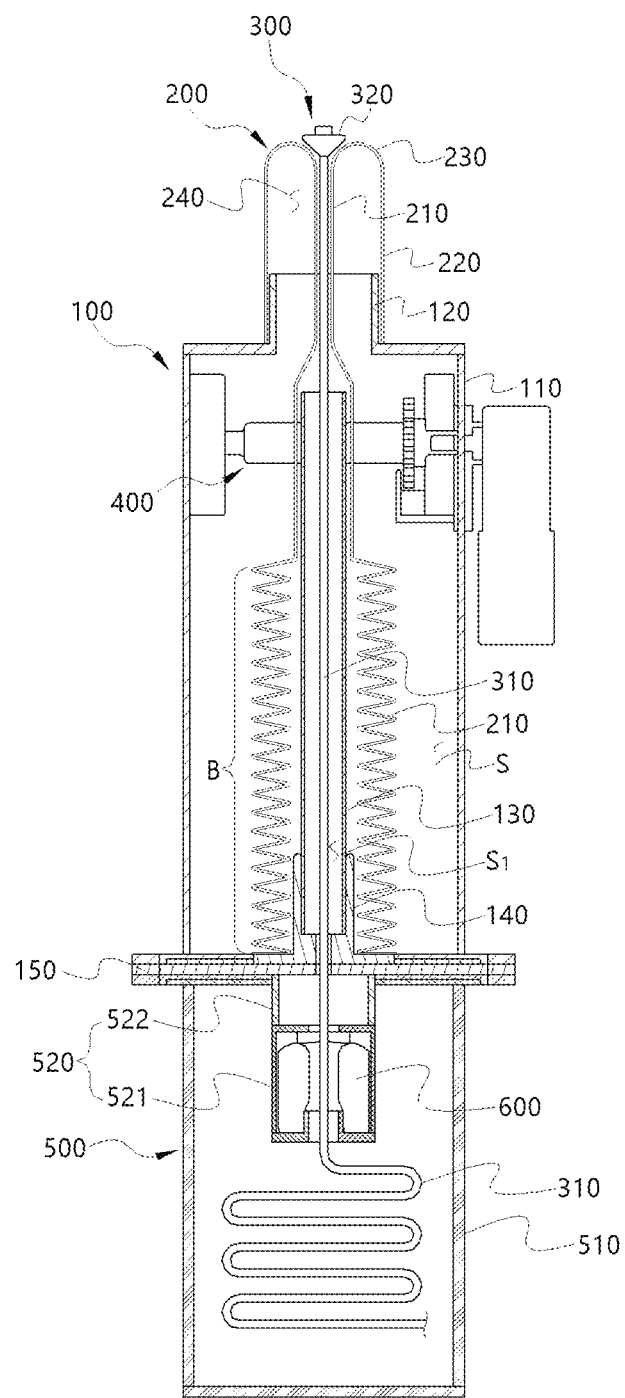
FIGS. 13 and 14 are side cross-sectional views of a growth-type soft robot according to a fifth exemplary embodiment of the present invention.
Figure 14:
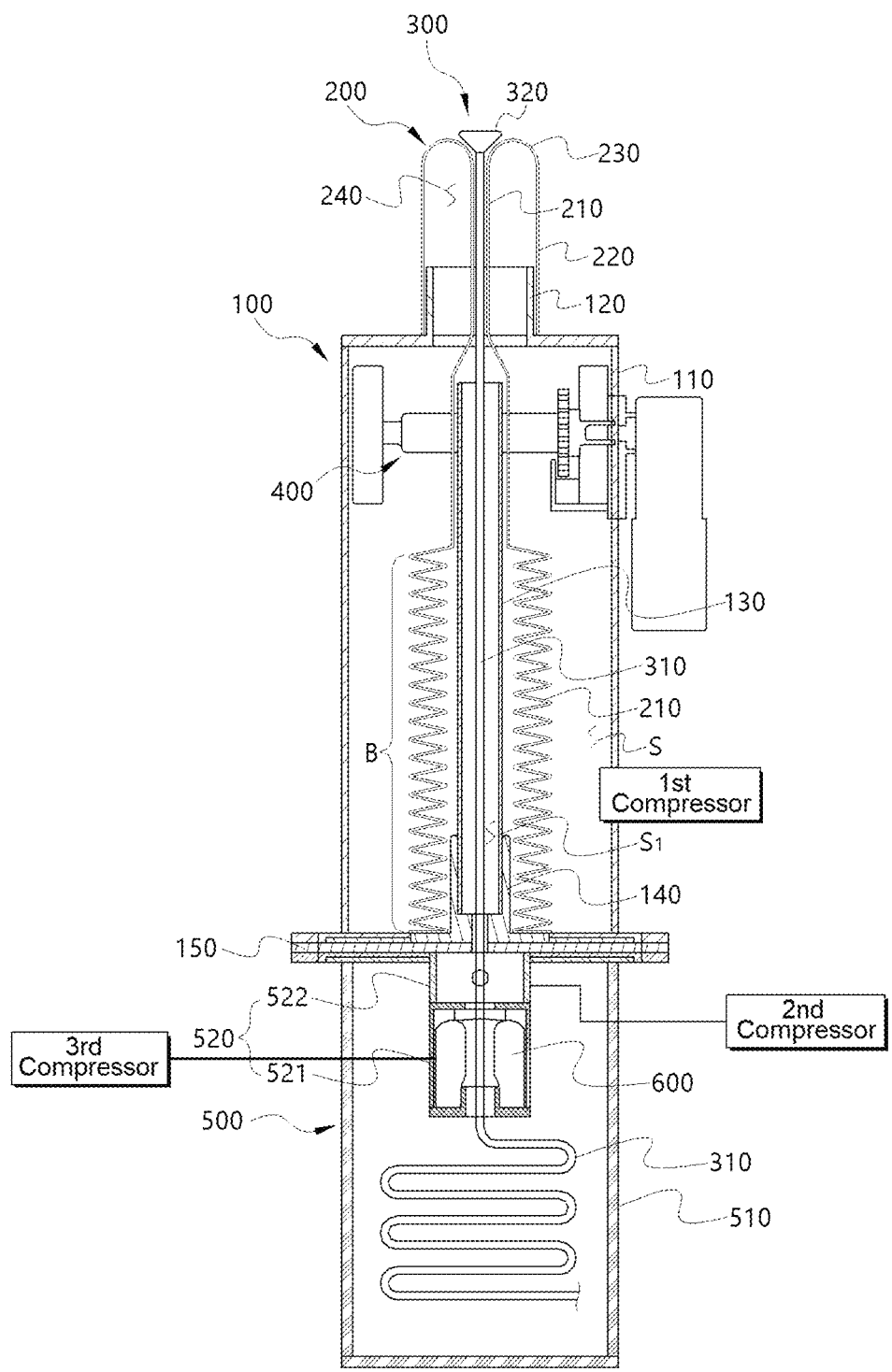

FIGS. 13 to 15 relate to a growth-type soft robot according to a fifth exemplary embodiment of the present invention, FIGS. 13 and 14 are side cross-sectional views, and FIG. 15 shows an operation example of the growth-type soft robot. Hereinafter, in the description of the growth-type soft robot according to the fifth exemplary embodiment of the present invention, the description of the same components as those of the exemplary embodiments described above will be omitted, and additional components will be described in more detail.

Referring to FIGS. 13 and 14, the growth-type soft robot according to the fifth exemplary embodiment of the present invention may further include a chamber 500 coupled to a rear surface of the housing 100. In this case, the chamber 500 may include a chamber body 510 connected to the external body 110 and a case 520 connected to the internal body 130. Here, the cable 310 of the data collecting unit 300 may be accommodated in the chamber body 510, and the cable 310 may extend to the front end of the external body by sequentially passing through the case 520 and the internal body 130.

The growth-type soft robot according to the fifth exemplary embodiment of the present invention may further include an airbag 600 disposed on the case 520 to apply tension to the cable 310. In this case, the case 520 may be provided in plurality including a first case 521 in which the airbag 600 is disposed and a second case 522 which is a space for injecting a gas having a different pressure into the inner periphery 210. Here, a first pneumatic supply unit may be connected to the accommodation space S of the external body 110 to inject a first gas, a second pneumatic supply unit may be connected to the inside of the second case 522 to inject a second gas, and a third pneumatic supply unit may be connected to the airbag 600 to inject a third gas. Here, pressure of the second gas may be greater than pressure of the first gas, and for example, the pressure of the second gas may be 2 to 3 times greater than the pressure of the first gas. In addition, the first pneumatic supply unit, the second pneumatic supply unit, or the third pneumatic supply unit may be configured in various forms capable of injecting gas, such as a compressor.

Figure 15A:
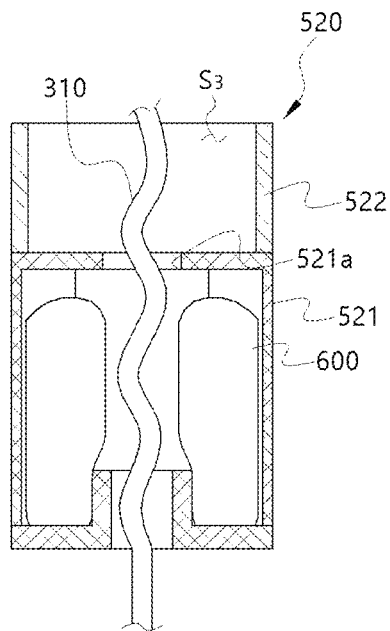
FIGS. 15A and 15B are a view illustrating an operation of the growth-type soft robot according to the fifth exemplary embodiment of the present invention.
Figure 15B:
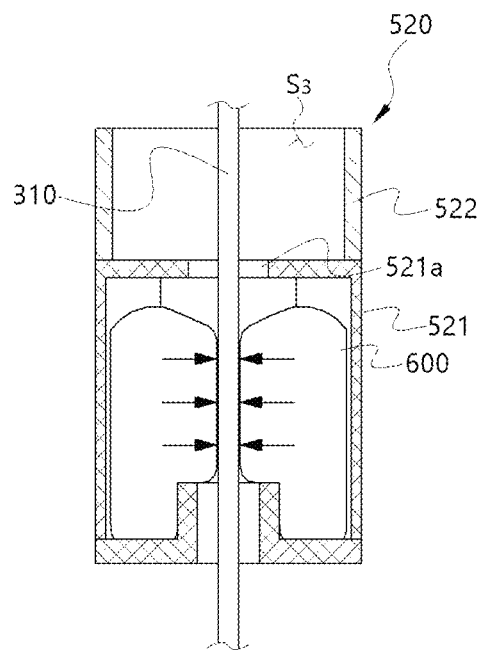

Referring to FIGS. 15A and 15B of FIG. 15, a partition may be formed between the first case 521 and the second case 522 and a through hole 521a may be formed so that the cable 310 may pass therethrough. Here, the airbag 600 disposed in the first case 521 may be expanded to press the cable 310 to provide tension against a driving force generated by the first gas. Accordingly, the cable 310 may be prevented from being excessively extended in length, and when the cable 310 is recovered, the airbag 600 may be contracted allowing smoother control. Here, as described above, a pressure control space $S_3$ may be formed inside the second case 522, and the second gas may flow into the pressure control space $S_3$ to adjust pressure.

Sixth Exemplary Embodiment

Figure 16:
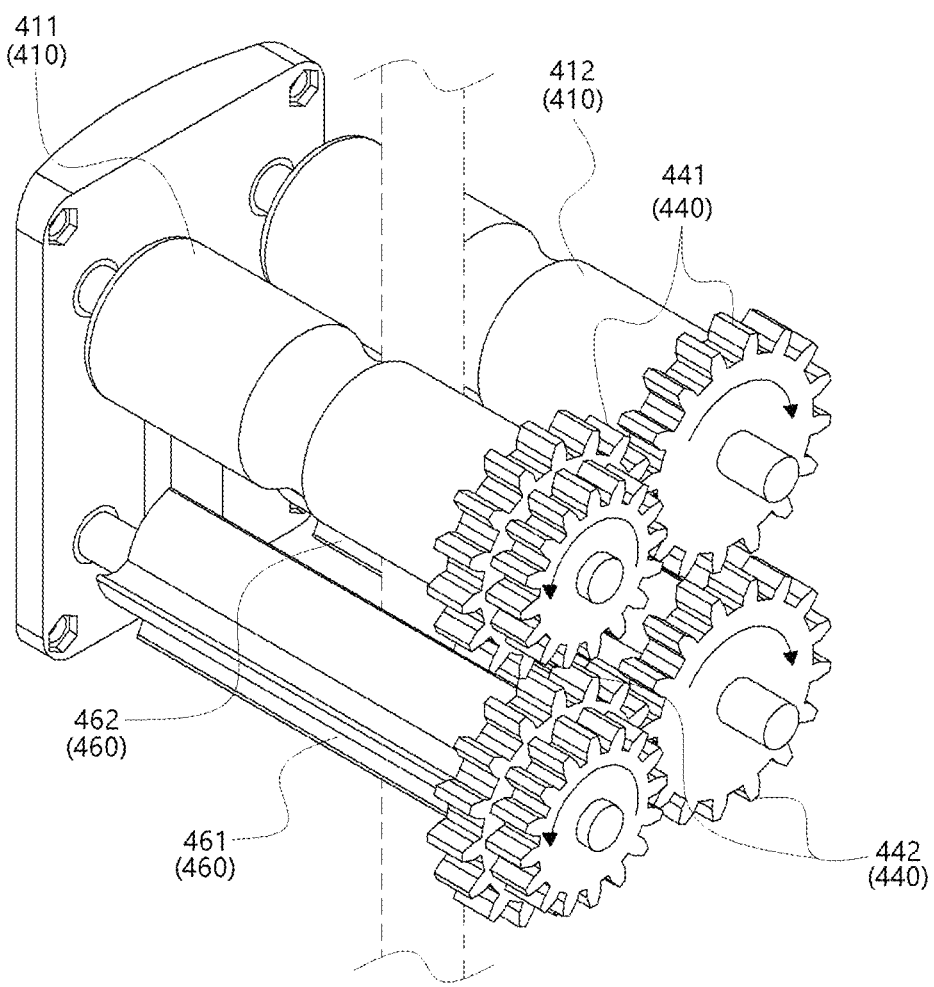
FIG. 16 is a perspective view of a roller unit according to a sixth exemplary embodiment of the present invention.
Figure 17:
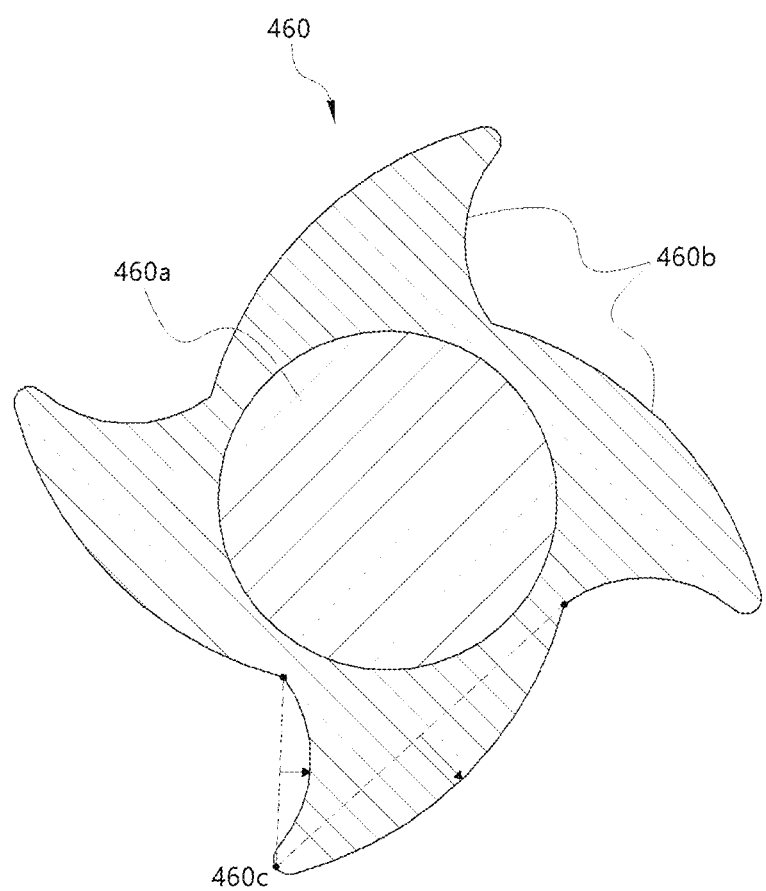
FIG. 17 is a cross-sectional view of an auxiliary roller according to the sixth exemplary embodiment of the present invention.

FIGS. 16 and 17 relate to a growth-type soft robot according to a sixth exemplary embodiment of the present invention, in which FIG. 16 is a perspective view of a roller unit and FIG. 17 is a cross-sectional view of an auxiliary roller.

Referring to FIG. 16, the growth-type soft robot according to the sixth exemplary embodiment of the present invention may be configured such that the roller unit 400 further includes an auxiliary roller 460. Here, the auxiliary roller 460 may be provided in plurality and may be spaced apart from each other, and a position thereof may be fixed, but the gear portion 440 may be connected and rotated. In addition, the gear portion 440 may be provided in plurality including a first gear portion 441 disposed on the driving roller 410 and a second gear portion 442 disposed on the auxiliary roller 460.

Referring to FIG. 17, the auxiliary roller 460 may include a roller body 460a having a circular cross-section and a protrusion 460b protruding outward from an outer circumferential surface of the roller body 460a. In this case, the protrusion 460b may be provided in plurality and may be spaced apart from each other in a circumferential direction of the roller body 460a. In addition, the protrusion 460b may be spirally curved to one side in a rotation direction.

The protrusion 460b may have an outer end 460c and may include a pair of inclined surfaces connecting the roller body 460a and the end 460c. Here, the pair of inclined surfaces may have lengths different in an outer side and inner side, having a curved shape. One inclined surface may be depressed on one side of a rotation direction and the other inclined surface may protrude to one side in the rotation direction to have different functions depending on the rotation direction. As shown, when the auxiliary roller 460 rotates in a counterclockwise direction, power for moving the growth unit 200 forward may be applied, and when the auxiliary roller 460 rotates in a clockwise direction, an external force may be applied to fold the growth unit 200.

As described above, the growth-type soft robot including a foldable growth unit of the present invention has advantages in that, since at least a portion of the growth unit is accommodated in a folded state in the housing, the data collecting unit for acquiring certain data may be easily mounted and a position of the data collecting unit may be independently controlled from the outside.

Accordingly, in the present invention, since the soft robot moves, while growing by supplying a new material to the end, all the advantages, including the inherent advantages of the growth unit that does not interact with the outside may be maintained as it is.

The effects of the present invention are not limited to the above-mentioned effects, and other effects not mentioned will be clearly understood by those skilled in the art from the description of the claims.

Although the present invention has been described in terms of specific items such as detailed elements as well as the limited embodiments and the drawings, they are only provided to help with a more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

| [Detailed Description of Main Elements] | |
|---|---|
| B: | folded region |
| S: | accommodation space |
| S₁: | internal space |
| S₂: | extended space |
| S₃: | pressure control space |
| 100: | housing |
| 110: | external body |
| 120: | fixing portion |
| 130: | internal body |
| 140: | coupling body |
| 150: | cover portion |
| 160: | guide body |
| 170: | extension body |
| 200: | growth nit |
| 210: | inner periphery |
| 220: | outer periphery |
| 230: | bent portion |
| 240: | front end space |
| 300: | data collecting unit |
| 310: | cable |
| 320: | sensing module |
| 400: | roller unit |
| 410: | driving roller |
| 410a: | roller body |
| 410b: | depression |
| 411: | first driving roller |
| 412: | second driving roller |
| 420: | first fixing portion |
| 430: | second fixing portion |
| 440: | gear portion |
| 450: | actuator |
| 460: | auxiliary roller |
| 461: | first auxiliary roller |
| 462: | second auxiliary roller |
| 500: | chamber |
| 510: | chamber body |
| 520: | case |
| 521: | first case |
| 521a: | through hole |
| 522: | second case |
| 600: | airbag |

What is claimed is:

1. A growth-type soft robot comprising:
a housing including an external body including an internal accommodation space and one side open and a fixing portion formed on a periphery of the opened side of the external body;
a growth unit including an outer periphery having one end connected to the fixing portion, an inner periphery spaced apart from an inner side of the outer periphery and extending to the accommodation space, and a bent portion connecting an other end of the outer periphery to one end of the inner periphery to form a front end space by the outer periphery, the bent portion, and the inner periphery;
a roller unit including at least one driving roller rotating in contact with the inner periphery; and
a data collecting unit including a cable extending along a central portion surrounded by the inner periphery and a sensing module provided on one side of the cable and acquiring external information,
wherein an other end of the inner periphery is folded by multiple stages to form a folded region, and a length of the growth unit is adjusted by pressure of air supplied to the front end space, and
wherein the housing further includes an internal body disposed in the accommodation space and extending to surround a portion of the cable, wherein the folded region surrounds a circumference of the internal body.

2. The growth-type soft robot of claim 1, wherein the at least one driving roller includes a pair of driving rollers and a gear portion, the pair of driving rollers is disposed to be spaced apart from each other based on the internal body and contacting the inner periphery, and the pair of driving rollers is formed to perform a rotational motion simultaneously through the gear portion.

3. The growth-type soft robot of claim 1, wherein the at least one driving roller includes a circular roller body and a depression inwardly depressed from the roller body, and the depression is disposed to face the internal body and depressed to face an outer curvature of the internal body.

4. The growth-type soft robot of claim 1, wherein the roller unit further includes one or more auxiliary rollers rotating in contact with the inner periphery and disposed to be spaced apart from the at least one driving roller in a direction along an axial length of the housing, each of the plurality of rollers includes one or more protrusions protruding outward based on the roller body, and an end of each of the plurality of protrusions is bent to be biased to one side of a rotation direction.

5. The growth-type soft robot of claim 4, wherein the one or more auxiliary rollers have a pair of inclined surfaces connecting the end of the protrusion to an outer circumferential surface of the roller body, and the pair of inclined surfaces has different lengths.

6. The growth-type soft robot of claim 5, wherein one of the pair of inclined surfaces protrudes to one side of the rotation direction, and the other inclined surface is depressed to one side of the rotation direction.

7. The growth-type soft robot of claim 6, wherein, among the pair of inclined surfaces, relatively shorter inclined surface is depressed to one side of the rotation direction so that the inner periphery of the growth unit is pressed to be folded.

8. The growth-type soft robot of claim 4, wherein the at least one driving roller includes a pair of driving rollers and a gear portion, the pair of auxiliary rollers is disposed to be spaced apart from each other across the internal body and in contact with the inner periphery, and the pair of driving rollers performs a rotational motion simultaneously through the gear portion.

9. The growth-type soft robot of claim 1, wherein the roller unit further includes a first fixing portion and a second fixing portion each fixing both ends of the at least one driving roller to an inner surface of the external body, and the roller unit is rotatably coupled with the first fixing portion and the second fixing portion.

10. The growth-type soft robot of claim 1, further comprising:
a chamber coupled to an other side of the housing; and
an airbag accommodated in the chamber and pressing the cable.

11. The growth-type soft robot of claim 1, wherein the housing further includes a guide body extending to one side of the internal body, the cable is disposed on a hollow of the guide body and the internal body, and an outer diameter of the guide body is smaller than an outer diameter of the internal body.

12. The growth-type soft robot of claim 1, wherein the housing further includes a coupling body disposed on an other side of the external body and fixing the other end of the inner periphery.

13. The growth-type soft robot of claim 12, wherein the housing further includes a cover portion disposed to surround the coupling body and coupled to be fixed with the external body.

14. The growth-type soft robot of claim 13, wherein the coupling body and the cover portion include a through hole through which the cable penetrates.

15. The growth-type soft robot of claim 12, wherein the coupling body includes a hollow opened on one side, and an inner diameter of the coupling body corresponds to an outer diameter of the internal body so that the internal body is inserted into the hollow of the coupling body.

16. The growth-type soft robot of claim 1, wherein the fixing portion has a shape in which a diameter thereof is reduced toward one side.

17. The growth-type soft robot of claim 1, wherein the housing further includes an extension body coupled to an other end of the external body, and a coupling body may be disposed on the extension body.

* * * * *